US007719251B2

(12) United States Patent
Qahouq et al.

(10) Patent No.: US 7,719,251 B2
(45) Date of Patent: May 18, 2010

(54) ENHANCEMENT OF POWER CONVERSION EFFICIENCY USING DYNAMIC LOAD DETECTING AND TRACKING

(75) Inventors: Jaber Abu Qahouq, Beaverton, OR (US); Lilly Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 11/834,648

(22) Filed: Aug. 6, 2007

(65) Prior Publication Data

US 2009/0040791 A1 Feb. 12, 2009

(51) Int. Cl.
*G05F 1/56* (2006.01)
(52) U.S. Cl. .................................. 323/286; 323/284
(58) Field of Classification Search .............. 323/271, 323/283, 284, 285, 286; 363/95, 97, 98
See application file for complete search history.

(56) References Cited

U.S. PATENT DOCUMENTS

| 5,729,448 | A |   | 3/1998 | Haynie et al. |   |
|---|---|---|---|---|---|
| 5,801,518 | A |   | 9/1998 | Ozaki et al. |   |
| 5,905,370 | A | * | 5/1999 | Bryson | 323/283 |
| 6,016,052 | A |   | 1/2000 | Vaughn |   |
| 6,055,168 | A |   | 4/2000 | Kotowski et al. |   |
| 6,157,182 | A |   | 12/2000 | Tanaka et al. |   |
| 6,366,070 | B1 | * | 4/2002 | Cooke et al. | 323/284 |
| 6,396,251 | B2 | * | 5/2002 | Corva et al. | 323/283 |
| 6,396,252 | B1 | * | 5/2002 | Culpepper et al. | 323/285 |
| 6,894,471 | B2 | * | 5/2005 | Corva et al. | 323/282 |
| 7,102,339 | B1 |   | 9/2006 | Ferguson |   |
| 7,109,688 | B1 | * | 9/2006 | Chiu et al. | 323/222 |
| 7,221,130 | B2 |   | 5/2007 | Ribeiro et al. |   |
| 7,368,897 | B2 | * | 5/2008 | Qahouq et al. | 323/282 |
| 2005/0258814 | A1 | * | 11/2005 | Chen et al. | 323/285 |
| 2007/0090821 | A1 | * | 4/2007 | Imai et al. | 323/284 |
| 2008/0174286 | A1 | * | 7/2008 | Chu et al. | 323/271 |

OTHER PUBLICATIONS

"PCT International Search Report", dated Mar. 6, 2009 for PCT/US2008/072067, 4pgs.

\* cited by examiner

*Primary Examiner*—Jeffrey L Sterrett
(74) *Attorney, Agent, or Firm*—Buckley, Maschoff & Talwalkar LLC

(57) ABSTRACT

A switching mode power converter may include a modulation circuit to dynamically control a variable switching frequency of the power converter based on an error voltage of the power converter. The power converter may also include a control circuit connected to the modulation circuit and arranged to dynamically limit an inductor current in the power converter while the switching frequency of the power converter changes. A variable limit on the inductor current may be based on the error voltage of the power converter, a load current of the power converter, or information from a power manager of a system in which the power converter resides. In some implementations, the power converter may also include a disabling circuit to control the modulation circuit to disable the variable switching frequency when a sufficiently large load transient is detected.

20 Claims, 8 Drawing Sheets

ENHANCEMENT OF POWER CONVERSION EFFICIENCY USING DYNAMIC LOAD DETECTING AND TRACKING

CROSS-REFERENCE TO RELATED APPLICATION

The present application is related to U.S. application Ser. No. 11/246,017, filed Oct. 7, 2005, entitled "Load Adaptive Power Converter," the entire content of which is incorporated by reference herein.

BACKGROUND

Implementations of the claimed invention generally may relate to the field of power supplies, and in particular to a mode transition scheme for a load-adaptive power converter.

The power loss of a DC/DC voltage regulator (VR) or a switching mode power converter/inverter (e.g. a pulse width modulated power converter) may include three components including, for example, switching loss, conduction loss and gate driver loss. In general, in order to reduce the total power loss, the switching loss and gate driver loss are lower at a lower switching frequency. However, the ripple voltage/current may increase as the switching frequency decreases. For a particular application, tradeoffs may be made based on load demands and component parasitics. In a light load, for example during a discontinuous conduction mode (DCM), a lower switching frequency (fixed or variable) may be utilized since the switching loss may be dominant and the conduction loss may be relatively small. In a medium or heavy load, for example during a continuous conduction mode (CCM), a fixed and higher switching frequency may be applied due to increasing conduction loss, including the ripple voltage/current, with a load current.

Various techniques may utilize both DCM and CCM to improve overall efficiency. In a Mode-Hopping technique, the DC-DC Buck VR for example operates in synchronous mode at CCM (Continuous Conduction Mode) at high load demand while the inductor current does not go below zero and operates in asynchronous mode at DCM (Discontinuous Conduction Mode) when the inductor current starts approaching the zero amperes point to reduce mainly conduction losses. In a Pulse-Skipping or variable switching frequency technique the VR switching frequency is lowered as the load becomes smaller to reduce mainly switching losses and can be implemented by using hysteretic control or variable frequency PWM control.

Both of these techniques result in efficiency improvement especially at light load. An issue with both the Mode-Hopping and Pulse-Skipping technique is that the output voltage ripple may increase during a transition between the CCM and DCM operation, which in some applications may exceed a maximum supply voltage deviation required by the load and increase the equivalent series resistance (ESR) power loss.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art, having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
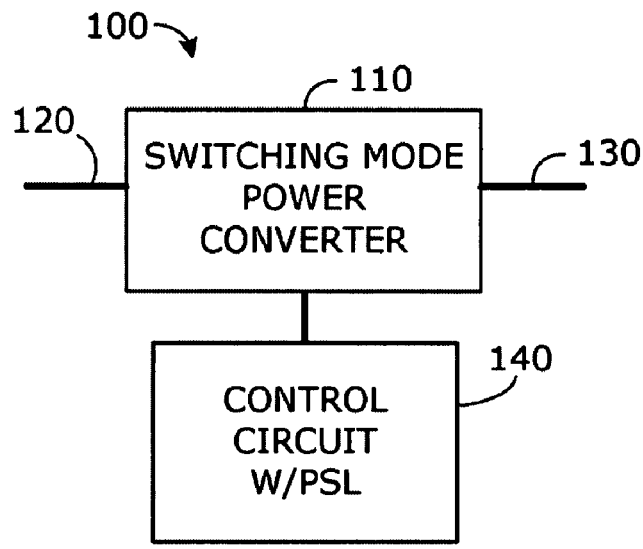
FIG. 1 is a block diagram of a load adaptive power converter.

With reference to FIG. 1, a load adaptive power converter 100 includes a switching mode power converter 110 having an input 1200 and an output 130. For example, the switching mode power converter 110 may be configured to transition between a continuous conduction mode at a first load level and a discontinuous conduction mode at a second load level, where the second load level is lower than the first load level. A control circuit 140 may be connected to the switching mode power converter 110. For example, the control circuit 140 may be configured to adjust the switching frequency of the switching mode power converter 110 during the transition between the continuous conduction mode and the discontinuous conduction mode in accordance with maintaining low voltage deviation between the output 130 of the switching mode power converter 110 and a reference voltage. For example, the switching mode power converter 110 may be a pulse width modulated (PWM) power converter. Adjusting the switching frequency of a switching mode power converter to maintain low ripple noise and/or voltage deviation may be referred to as a Pulse-Sliding (PSL) technique. Accordingly, control circuit 140 may be referred to as a control circuit with PSL 140.

For example, in some embodiments of the present invention, the control circuit 140 may be configured to increase the switching frequency of the switching mode power converter 110 during the transition between the continuous conduction mode and the discontinuous conduction, to be higher than a steady state switching frequency during the continuous conduction mode (e.g. to reduce ripple noise). The increase in switching frequency may be significant (e.g. at least about five percent) or even substantial (e.g. at least about twenty five percent). In some embodiments, the control circuit 140 may be further configured to decrease the switching frequency of the power converter 110 after increasing the switching frequency of the switching mode power converter 110 during the transition region between CCM and DCM and vice versa. For example, the control circuit 140 may be configured to adjust the switching frequency of the power converter 110 in a step-wise manner, linear manner, non-linear manner, piece-wise manner, or in a continuously adjusted manner. This can be done for example by tracking the output ripple to maintain it within certain range when load current is around the point of CCM and DCM.

Figure 2:
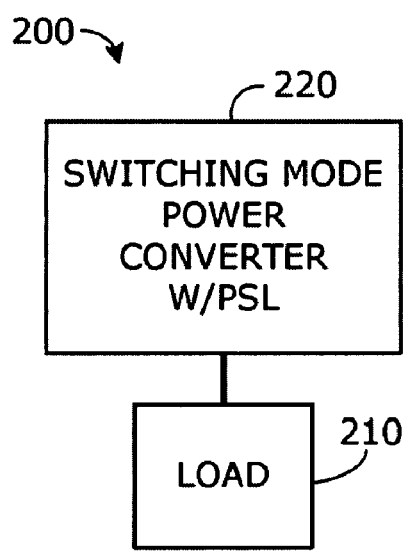
FIG. 2 is a block diagram of a system including a load adaptive power converter.

With reference to FIG. 2, an electronic system 200 includes a load circuit 210 (e.g. including a processor), and a power supply unit 220 connected to the load circuit 210. The power supply unit 220 includes a switching mode power converter with PSL. For example, according to some embodiments of the present invention, the power supply unit 220 includes a switching mode power converter having an input and an output, wherein the switching mode power converter is configured to transition between a continuous conduction mode at a first load level and a discontinuous conduction mode at a second load level, where the second load level is lower than the first load level. The power supply unit 220 may further include a control circuit connected to the switching mode power converter, wherein the control circuit is configured to adjust the switching frequency of the switching mode power converter during the transition between the continuous conduction mode and the discontinuous conduction mode in accordance with maintaining low voltage deviation with respect to a reference voltage. Advantageously, high efficiency at light load may be maintained while keeping voltage ripple or deviation within specific range. For example, the switching mode power converter may be a PWM power converter.

For example, the system 200 may be a personal digital assistant (PDA), a cell phone, a portable entertainment device (e.g. an MP3 player or video player), or other mobile or handheld device powered with a battery or other energy limited source. The system 200 may also be a desktop or set top device such as for example, a personal computer (PC), an entertainment PC including an AC/DC power converter. The system 200 can also be any computing, communication, or other electronic system which utilizes a DC/DC voltage regulator.

In some embodiments of the system 200, the control circuit of the power supply unit 220 may be configured to increase the switching frequency of the switching mode power converter during the transition between the continuous conduction mode and the discontinuous conduction, to be higher than a steady state switching frequency during the continuous conduction mode (e.g. to reduce ripple noise). The increase in switching frequency may be significant (e.g. at least about five percent) or even substantial (e.g. at least about twenty five percent). In some embodiments of the system 200, the control circuit of the power supply unit 220 may be further configured to decrease the switching frequency of the switching mode power converter after increasing the switching frequency of the switching mode power converter. For example, the control circuit may be configured to adjust the switching frequency of the switching mode power converter in a step-wise or other suitable manner (e.g. a substantially continuously adjusted manner).

Without being limited to theory of operation, some embodiments of the present invention may involve a control scheme which may enable the effective and efficient transition between modes of operation for a load adaptive power converter or DC/DC voltage regulator. For the sake of power saving, different operation modes or conditions may be applied in a converter design based on the performance demands. However, even though static behavior is often well managed under each mode of operation, it is believed that ripple noise and its associated power loss during the transition between modes may be a problem in some applications.

According to some embodiments of the invention, a control circuit is configured to manage the mode transition between a continuous conduction mode (CCM) and a discontinuous conduction mode (DCM). For example, the control circuit may introduce a third mode of operation (e.g. a transition mode) with non-linear variable frequencies, or substantially increasing/decreasing the switching frequency of the PWM converter during the transition of CCM and DCM, while reducing or minimizing the power loss and significant ripple noise and/or other overshoot effects. For example, the control circuit may adjust the switching frequency during the transition between the CCM and DCM modes in order to reduce the power losses while maintaining low ripple. For example, in some embodiments this is accomplished by increasing the switching frequency at mode transition to be higher than the steady state switching frequency in CCM mode, and then decreasing it, rather than only gradually increasing or decreasing the switching frequency at the mode transition.

The ripple during the DCM operation may behave differently as compared to the ripple during the CCM operation, and the ripple may also behave differently and in a non-linear fashion at the CCM-DCM transition area. Our analysis shows that the magnitude of ripple noise may be much higher during the DCM-CCM transition if the switching frequency of a PWM converter gradually increases (e.g. linearly or in a step-wise gradual manner) to the steady state switching frequency for the CCM operation mode. Likewise, our analysis shows that the magnitude of ripple noise may be much higher during the CCM-DCM transition if the switching frequency of a PWM converter decreases gradually (e.g. linearly or in a step-wise gradual manner) to the reduced switching frequency for the DCM operation mode. In both cases, the power loss due to ripple noise may be substantial during the transition.

Figure 3:
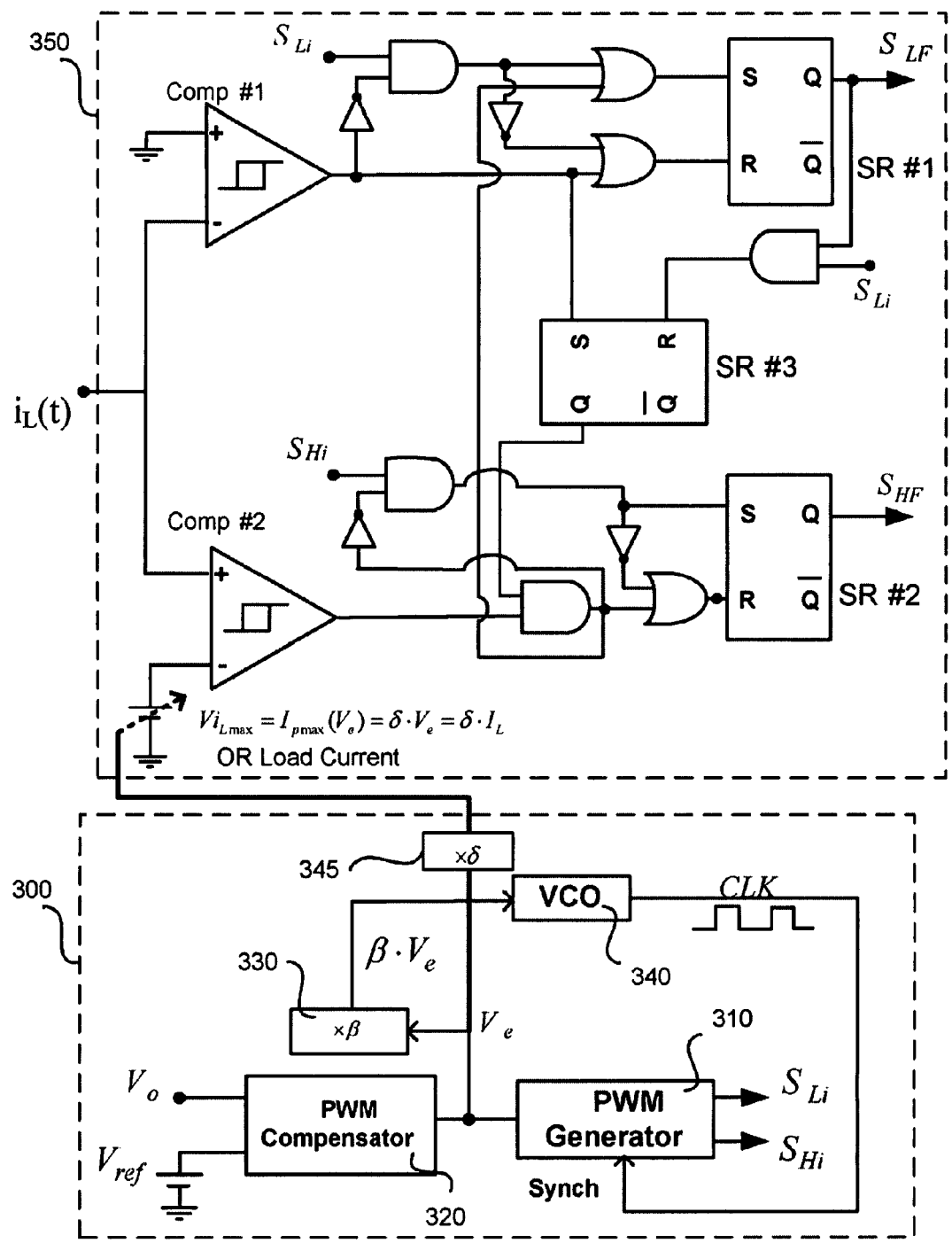
FIG. 3 is a block diagram of a PWM circuit and a control circuit according to some implementations of the invention.

With reference to FIG. 3, a non-limiting example implementation for an example PSL technique includes a PWM circuit 300 and a control circuit 350. The PWM circuit 300 includes a PWM generator 310 which provides two signals, $S_{Li}$ and $S_{Hi}$, which are synchronous complementary PWM control signals. A PWM compensator 320 receives the output voltage $V_O$ and a reference voltage $V_{REF}$ and provides a modulation error signal $V_E$ to the PWM generator 310. In some implementations, the modulation error signal $V_E$ may be a difference between the output voltage $V_O$ and the reference voltage $V_{REF}$. A gain circuit 330 receives the error signal $V_E$ and provides a PWM compensator error signal ($\beta \cdot V_E$) to a voltage controlled oscillator (VCO) 340. The output of the VCO 340 is fed back to the PWM generator 310 as a synchronization signal (Synch).

The signals SLi and SHi, generated by the PWM generator 310, will control the VR switching frequency in both CCM and DCM modes. The PWM generator frequency is controlled by a synchronization signal Synch that is supplied by the input voltage of the VCO 340, which decides the switching frequency. The input voltage of the VCO 340 is controlled by voltage signal proportional to the PWM compensator error signal ($\beta \cdot V_E$). Note that $\beta \cdot V_E$ is proportional to the duty cycle, which starts with a large value at CCM-DCM transition region and drops quickly as the VR goes deeper into the DCM mode. This characteristic may force a higher switching frequency in the transition mode and a lower switching frequency deeper in the DCM mode, providing improved light load efficiency while maintaining low steady-state ripple and good dynamic performance. The VCO input voltage may also be controlled by signals other than $\beta \cdot V_E$ such as the load current and voltage ripple signals to achieve the required PSL.

PWM circuit 300 may also provide an output to control circuit 350 that dynamically adjusts or modulates a limit of the peak inductor current of the power converter 110. One example of a circuit that generates such an output may be scaling circuit 345 that produces an output ($\delta \cdot V_E$) that is proportional to the modulation error signal $V_E$. The operation of scaling circuit 345 will be explained below in greater detail with respect to FIGS. 4A and 4B. Other possible outputs from circuit 300 to adjust or modulate the limit of the peak inductor current may include a value related to the load current $I_L$ and/or a control signal from system power management circuitry. An example of the latter will be explained below in greater detail with respect to FIGS. 5A and 5B.

Again with reference to FIG. 3, the control circuit 350 provides two signals, $S_{LF}$ and $S_{HF}$, which are the PWM control signals that drive the power converter, for example, a buck converter VR low-side and high-side switches, respectively. The inductor current $i_L(t)$ is sensed to detect when the inductor current tries to go below zero by a comparator Comp #1 that will go output high and reset the latch SR1 to force DCM mode by forcing $S_{LF}$ to go zero. The latch SR1 is set again at the next switching cycle by the OR-gate. The latch SR2 generates the high-side switch control signal $S_{HF}$. The latch SR2 is set by $S_{Hi}$ and reset by an AND gate output that will go high if both Comp #2 output is high and the latch SR3 is set.

The second comparator's Comp #2 output will go high if the inductor current peak exceeds a dynamic threshold (e.g. a function of the error voltage $V_E$, a function of the load current $t\ I_L$, or a control signal from system power management circuitry) in DCM mode. The latch SR3 will be set only when CMP1 output is high, which means that the current mode is DCM. Therefore, the dynamic peak current limit will be only active in DCM mode to maintain a certain output voltage ripple, while also increasing the efficiency of power converter 110 relative to, for example, a static inductor current limit as disclosed in the related application.

Figure 4A:
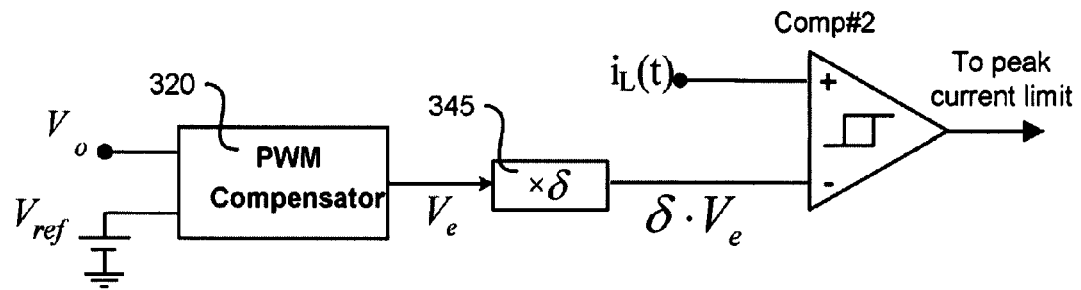
FIG. 4A is a block diagram of one circuit to generate a peak current limit signal.

FIG. 4A is a block diagram of one circuit to generate a peak current limit signal as a function of the modulation error voltage $V_E$. The circuit shown in FIG. 4A includes those portions of PWM circuit 300 (i.e., PWM compensator 320 and scaling circuit 345) and control circuit 350 (i.e., Comp #2) that generate the peak current limit signal. As previously described, PWM compensator 320 generates the modulation error voltage $V_E$. Scaling circuit 345 produces an output that is a function of error voltage $V_E$ (e.g., a value ($\delta \cdot V_E$) that is proportional, but other functions of $V_E$ are possible). This proportional value ($\delta \cdot V_E$) is input to Comp #2 as the threshold at which Comp #2 acts to limit the inductor current $i_L(t)$.

Figure 4B:
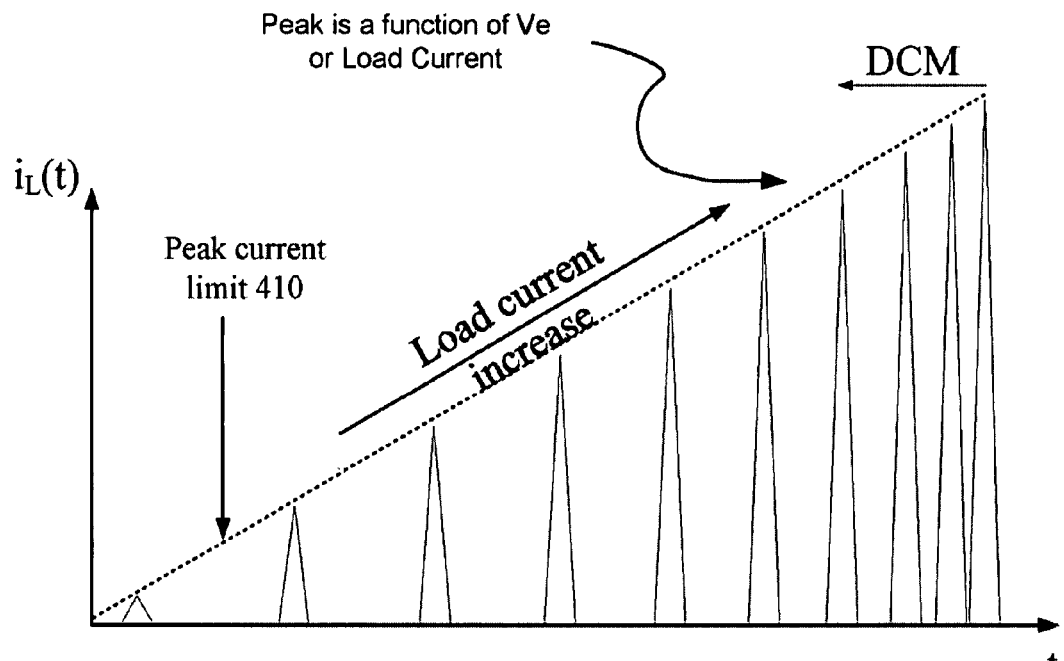
FIG. 4B is a plot of inductor current corresponding to the circuit of FIG. 4A.

FIG. 4B is a plot of inductor current $i_L(t)$ corresponding to the limiting circuit of FIG. 4A. Dotted line 410 shows the varying peak inductor current limit (or threshold) that increases with both increasing modulation error voltage $V_E$ and with increasing load current, although the load current $I_L$ may have a different constant of proportionality than $\delta$ for the error voltage $V_E$. In this manner the dynamic peak current limit 410 may maintain a certain output voltage ripple, while also increasing the efficiency of power converter 110 due to the dynamic nature (changing with load) of the limit.

Figure 5A:
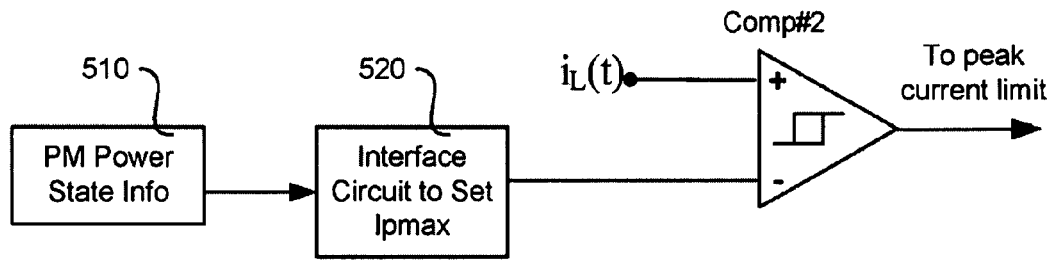
FIG. 5A is a block diagram of another circuit to generate a peak current limit signal.

FIG. 5A is a block diagram of another circuit to generate a peak current limit signal based on information from a platform power management engine. Such an engine (not shown) may manage power for an entire platform in which converter 110 resides. Comparing FIG. 5A to FIG. 4A, compensator 320 and circuit 345 may be replaced by power manager (PM) power state information module 510 and interface circuit 520 to provide an inductor current threshold to Comp #2. Module 510 may provide power state information from a platform PM. Such information may, in some implementations, be a discrete set of values, or gradations, corresponding to lower to higher power usage states.

Interface circuit 520 may translate this power state information from module 510 into inductor current limits for Comp #2. Such inductor current thresholds or limits may in some implementations, be used by the PM to optimize the efficiency of converter 110 to a particular application or set of applications.

Figure 5B:
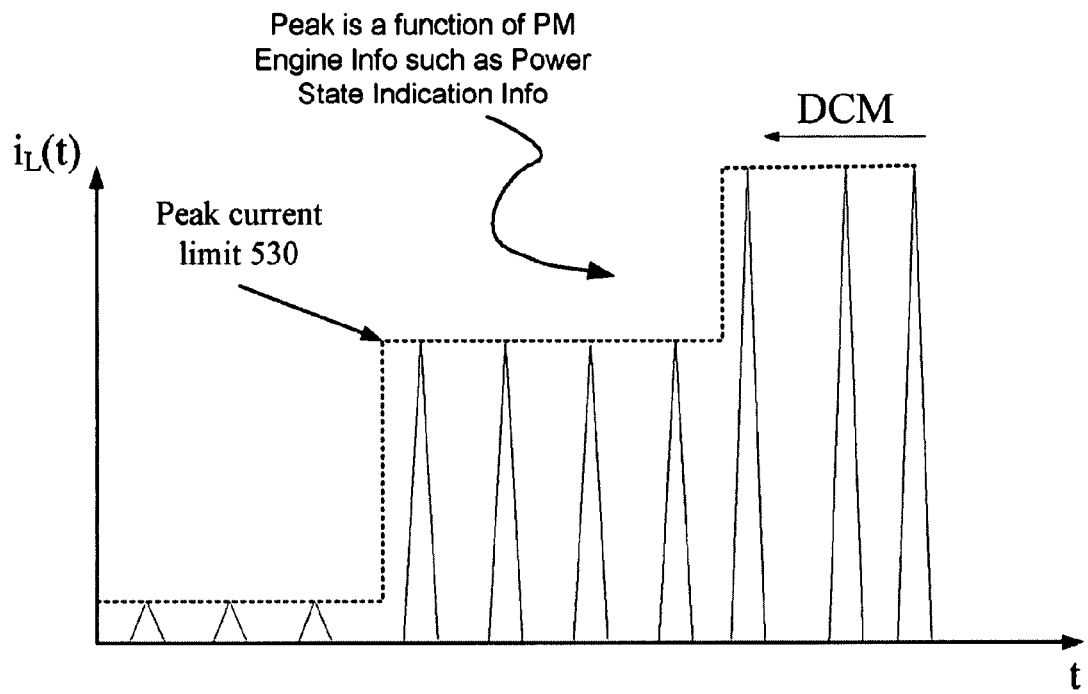
FIG. 5B is a plot of inductor current corresponding to the circuit of FIG. 5A.

FIG. 5B is a plot of inductor current $i_L(t)$ corresponding to the circuit of FIG. 5A. Dotted line 530 shows the varying peak inductor current limit (or threshold) according to different power state information from module 510. At a first time, the power state dictates that the current limit be relatively small; at a later time, the current limit may be larger. Finally, during the last time period shown, the power state of the platform in which converter 110 resides permits the inductor current to have a relatively high limit or threshold for Comp #2. In this manner the dynamic peak current limit 510 may maintain a certain output voltage ripple, while also increasing the efficiency of power converter 110 due to the dynamic nature (changing with different power states) of the limit.

Returning to FIG. 3, the latch SR3 will be reset each time the latch SR1 is set by $S_{Li}$ or by the AND-gate output. This is because whenever the latch SR2 is reset in DCM mode to force $S_{HF}$ to go low and prevent the inductor peak current from exceeding the limit, the latch SR1 should be set to provide a path for the inductor current.

In the DCM-CCM transition region, $V_E$ value will increase, and hence the switching frequency will increase. This is because CMP2 will turn OFF/reset $S_{HF}$, earlier than the PWM compensator 320 commanded, to limit the inductor peak current which will result in a duty cycle that is smaller than what is needed to charge the output capacitor and maintain the output voltage and hence force the PWM compensator 320/controller 350 to increase $V_E$ to deliver larger duty cycle.

Advantageously, the PWM circuit 300 and control circuit 350 implement a PSL technique which provides a non-linear variable switching frequency which may improve the VR efficiency at lighter loads while keeping low steady-state ripple at light loads without the need to add larger output capacitance.

Further advantageously, the threshold of the peak inductor current is dynamically adjusted using the modulation error signal $V_E$ or information related to a load current. In contrast to the related application, where the reference value of the peak inductor current was pre-set as a fixed value over an entire load operation, the dynamic scheme herein provides a way to reduce the static voltage deviation such as ripple voltage while achieving even higher power conversion efficiency. Those skilled in the art will appreciate that FIG. 3 illustrates one example of a suitable control circuit. Given the benefit of the present specification, those skilled in the art may readily construct other circuits to implement a PSL technique. Suitable PSL techniques may be implemented with discrete circuits and/or digital circuits with appropriate programming.

Figure 6:
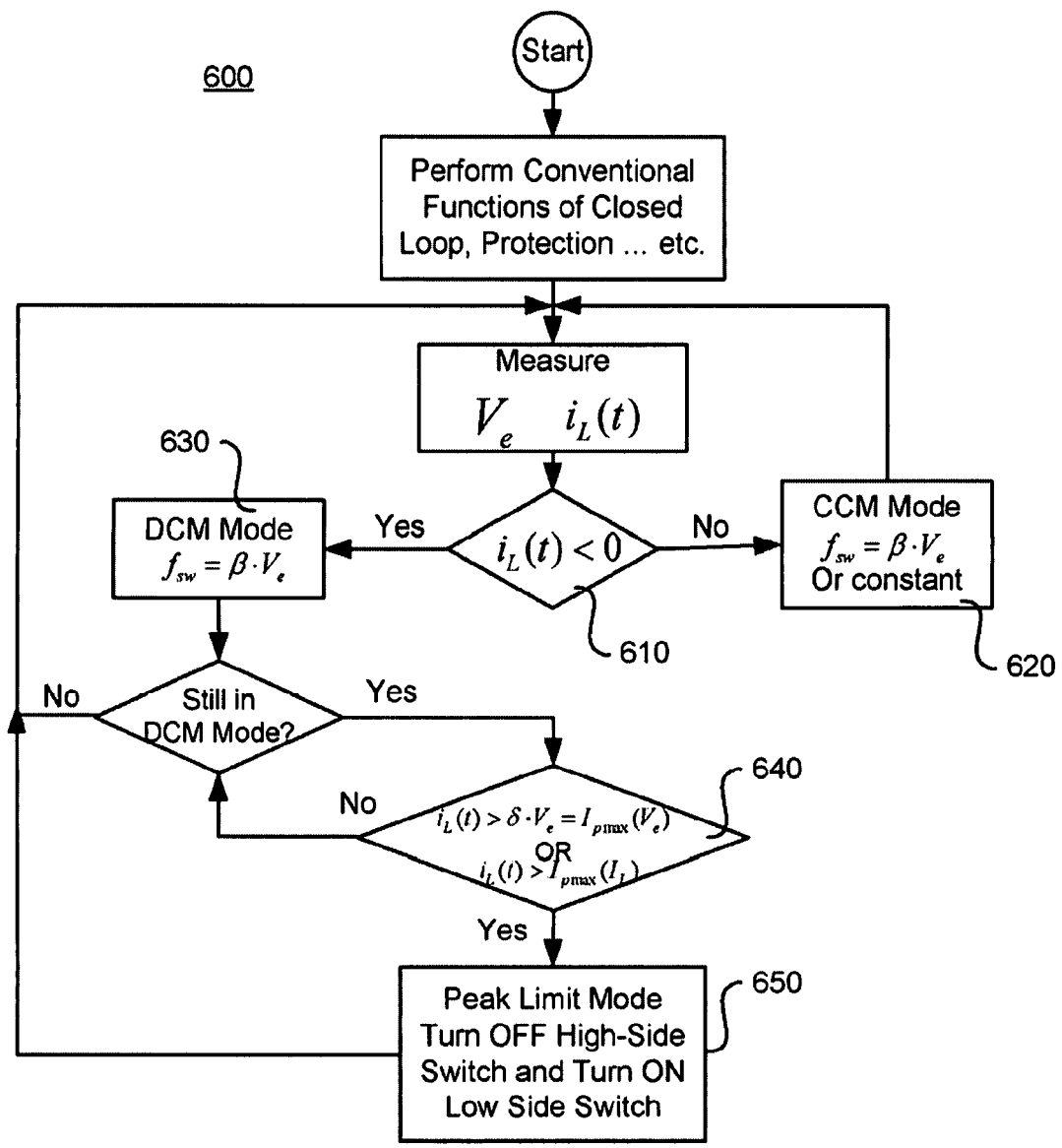
FIG. 6 provides a flowchart for the operation of FIGS. 3-5A.

FIG. 6 provides a flowchart 600 for the operation of FIG. 3-5A. The operation may begin with PWM circuit 300 and control circuit 350 respectively measuring or providing the modulation error voltage $V_E$ and inductor current $i_L(t)$. Then Comp #1 in circuit 350 may determine whether $i_L(t)$ is less than zero [act 610]. If not, control circuit 350 may enter CCM mode, with a switching frequency that is constant or that is proportional to the error voltage $V_E$ [act 620]. If the inductor current $i_L(t)$ is less than zero, control circuit 350 may enter DCM mode, with a switching frequency that is proportional to the error voltage $V_E$ [act 630].

If the inductor current $i_L(t)$ is greater than a value proportional to the error voltage $V_E$ or the load current $I_L$ (or a value based on the power state of the platform as explained with regard to FIGS. 5A and 5B) [act 640], control circuit 350 may enter peak limit mode [act 650]. In such a mode, Comp #2 may turn off the high side switch SR #2 and turn on the low side switch SR #1. The error voltage $V_E$ should increase as a result of this action, providing a frequency increase to limit the peak inductor current $i_L(t)$ in power converter 110.

Figure 7:
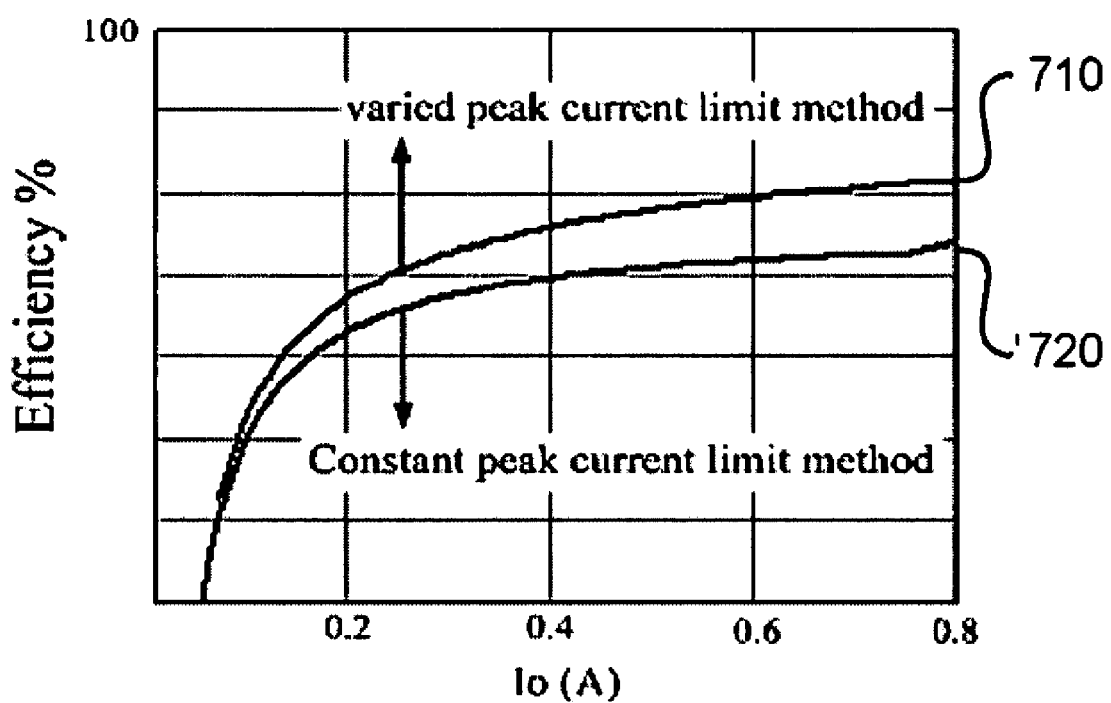
FIG. 7 contrasts the power efficiency curve of the power converter under the operation mode of FIG. 6 with a that of a power converter that does not dynamically limit peak inductor current.

FIG. 7 contrasts the power efficiency curve 710 of the power converter 110 under the operation mode of FIG. 6 with a corresponding curve 720 of another power converter that does not dynamically limit peak inductor current. As may be seen, curve 710 resulting from a dynamic inductor current limiting scheme as described above is more efficient for most output currents $I_O$ greater than about 0.1 A.

In addition to the dynamic inductor current limiting scheme described above, another scheme may be used to control an output voltage deviation during transient events, especially such events with high-to-low load transients. Although this is an additional technique, it may also be used independently, without the dynamic limiting described above. This second technique further enhances the power efficiency while maintaining acceptable transient performance.

When a load changes from a higher value to a lower value, the operational frequency (e.g., PWM frequency) of converter 110 is reduced with the load, which causes a large overshoot or output voltage deviation due to the reduction of speed or bandwidth (BW) of conversion compensation loop. The scheme herein may substantially remove such large overshoot or deviation by using the output capacitor's current signal $i_C(t)$ or the current spike at the instant of a load transient. This rapid change in capacitor current $i_C(t)$ may be detected instantaneously or recovered by differentiating the output voltage.

Because the capacitor current signal $i_C(t)$ is significantly faster in nature when compared to voltage sensing using the traditional approach, the transient response of converter 110 may be greatly improved by disabling the variable frequency operation during load transients. The operating frequency of converter 110 may then be set to a value equal to a nominal value used in the CCM mode or any other value desired for a specific application. This approach will result in lower voltage deviation and better performance characteristics of power conversion during load transients.

Figure 8A:
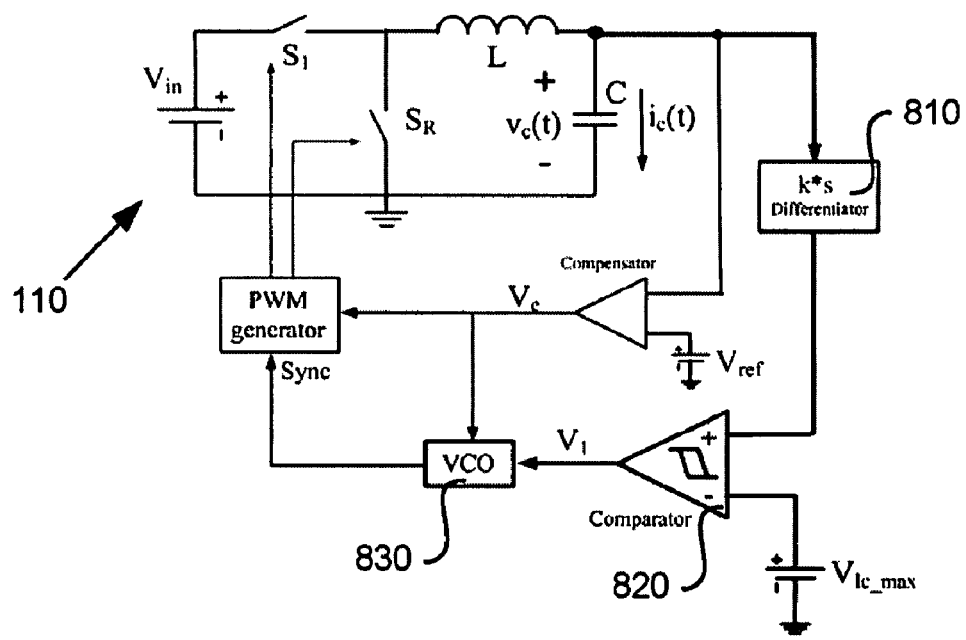
FIG. 8A is a block diagram of a power converter to adjust modulator frequency during a load transient.

FIG. 8A is a block diagram of a power converter 110 to adjust modulator frequency during a load transient. Although the converter 110 does not explicitly show all components of FIG. 3 (e.g., control circuit 350), it may nonetheless include them. In addition to typically present components, such as PWM generator, switches, inductor L, and output capacitor C, converter 110 in FIG. 8A may include a differentiator 810, a comparator 820, and VCO 830. VCO 830 may normally provide a variable frequency signal to the PWM generator based on the modulation error voltage $V_e$ from the compensator.

When the rate of change of the output voltage $v_C(t)$ as determined by differentiator 810 exceeds a value $V_{1C_{max}}$ that corresponds to a maximum allowable change in capacitor current $i_C(t)$, comparator 820 may output a control signal $V_1$ to VCO 830. This control signal $V_1$ may disable the variable frequency operation (e.g., frequency lowering) of VCO 830 due to its error voltage $V_e$ input. VCO 830 may then operate at a default "transient" frequency, such as a nominal value used in the CCM mode or any other suitable modulation frequency (e.g., a relatively high frequency) that limits voltage overshoot at the output of converter 110. Although comparator 820 shown in FIG. 8A may control VCO 830 in the presence of overshoot, another parallel comparator (not shown) may be added to perform similarly in the presence of a large undershoot.

Figure 8B:
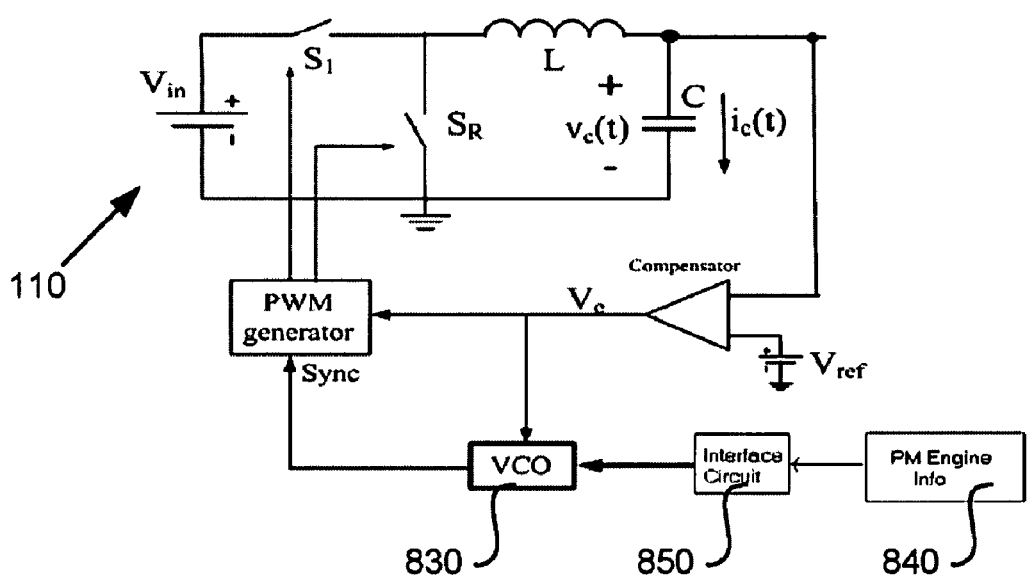
FIG. 8B is a block diagram of another power converter to adjust modulator frequency during a load transient.

FIG. 8B is a block diagram of another power converter 110 to adjust modulator frequency during a load transient. In contrast to the measurement-based adjustment in FIG. 8A, the circuit in FIG. 8B may disable the error voltage $V_e$ input to VCO 830 based on information from the PM engine (module 840) that is appropriately translated into a suitable control input by interface circuit 850. In such implementations, the PM information also may, due to a change in application or some other event by the PM known, be able to control the switching frequency of the PWM generator as the load transient occurs.

Figure 9:
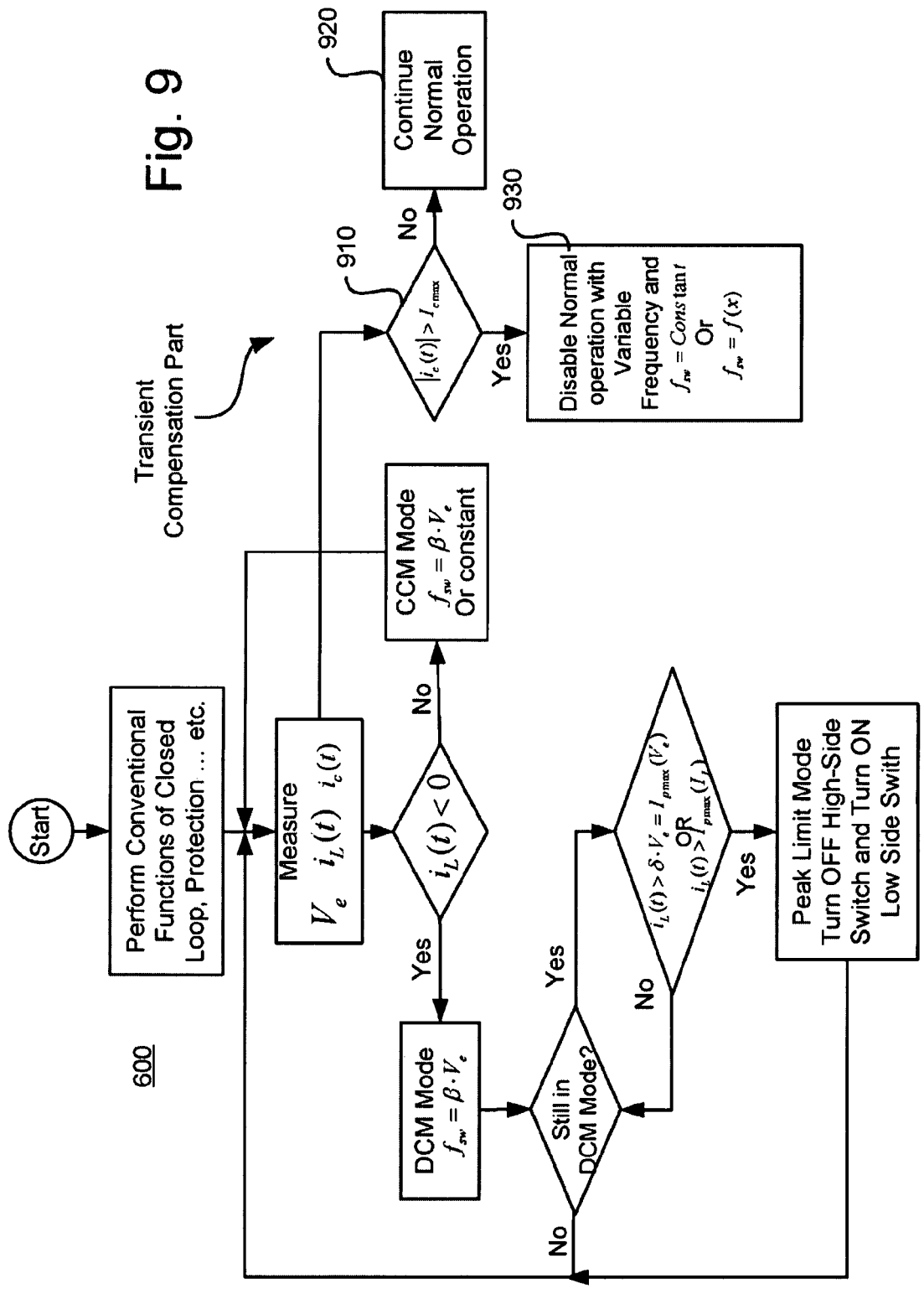
FIG. 9 provides a flowchart for the operation of FIG. 8A.

FIG. 9 provides a flowchart for the operation of FIGS. 8A and 8B. Although portions of flowchart 600 are shown for reference, the transient compensation portions performed by the circuits in FIGS. 8A and 8B are illustrated by acts 910-930 on the right side of the figure. In act 910, it may be determined whether the instantaneous capacitor current $|i_C(t)|$ exceeds a predetermined current threshold $I_{Cmax}$. Such determination may take place by measuring the instantaneous current, or by differentiating the output voltage as in FIG. 8A. If the capacitor current is less than the threshold value, VCO 830 continues with normal, variable-frequency operation in act 920 based on the error voltage $V_e$.

It should be noted that in some implementations, such as the one in FIG. 8B, the determination in act 910 may be based on power management (PM) information, rather than instantaneous current. In such implementations, if the threshold is not exceeded, normal operation also continues in act 920.

If a transient event is detected in act 910 by a chosen criteria, normal operation of VCO 830 with a variable frequency is disabled in act 930. VCO 830 may then operate at a fixed switching frequency such as a nominal value used in the CCM mode or any other frequency value desired for a specific application. In some implementations, VCO 830 may operate in act 930 at a frequency that is a function f(x) of a system variable other than the error voltage $V_e$. In some implementations, VCO 830 may operate in act 930 at a frequency that is an inverse or opposite function of the frequency that would normally be produced by the error voltage $V_e$.

The above-described scheme and/or system may advantageously achieve power conversion efficiency improvements and variable frequency operation while keeping static ripple deviations low and controlled using the variable modulated peak inductor current (based on error voltage Vc, load current, or/and PM info) tracking. The above-described scheme and/or system also may advantageously keep dynamic ripple deviation low and controlled by disabling variable frequency operation or adjusting the frequency in another direction during transients based on the output capacitor's current and voltage.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

No element, act, or instruction used in the description of the present application should be construed as critical or essential to the invention unless explicitly described as such. Also, as used herein, the article "a", is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A switching mode power converter, comprising:
   a modulation circuit to dynamically control a variable switching frequency of the power converter based on an error voltage of the power converter; and
   a control circuit connected to the modulation circuit and arranged to dynamically limit an inductor current in the power converter while the switching frequency of the power converter changes, a variable limit on the inductor current being based on the error voltage of the power converter, a load current of the power converter, or information from a power manager of a system in which the power converter resides.

2. The converter of claim 1, wherein the modulation circuit includes:
   a compensator to generate the error voltage from an output voltage of the converter and a reference voltage; and
   a voltage controlled oscillator to provide an output frequency based on the error voltage.

3. The converter of claim 2, wherein the modulation circuit further includes:
   a pulse width modulation generator to generate the variable switching frequency based on the error voltage from the compensator and the output frequency from the voltage controlled oscillator.

4. The converter of claim 1, wherein the control circuit is arranged to dynamically limit the inductor current when the converter is operating in a discontinuous conduction mode.

5. The converter of claim 1, wherein the variable limit on the inductor current is solely based on a value proportional to the error voltage of the power converter.

6. The converter of claim 1, wherein the variable limit on the inductor current is solely based on a value proportional to the load current of the power converter.

7. The converter of claim 1, further comprising:
   a transient detector to detect a load transient based on a current of an output capacitor or on a voltage of the output capacitor; and
   a disabling circuit to control the modulation circuit to disable the variable switching frequency when the transient detector detects the load transient.

8. The converter of claim 7, wherein the disabling circuit causes the modulation circuit to output a constant switching frequency when the transient detector detects the load transient.

9. An switching mode power converter, comprising:
   a modulation circuit to dynamically control a variable switching frequency of the power converter based on an output voltage of the power converter;
   a transient detector to detect a load transient based on a current of an output capacitor or on a voltage of the output capacitor; and
   a disabling circuit to control the modulation circuit to disable the variable switching frequency when the transient detector detects the load transient.

10. The converter of claim 9, wherein the disabling circuit causes the modulation circuit to output a constant switching frequency when the transient detector detects the load transient.

11. The converter of claim 9, wherein the transient detector detects a load transient when an instantaneous current of the output capacitor exceeds a current threshold or when a rate of change of the voltage of the output capacitor exceeds a voltage rate threshold.

12. The converter of claim 9, wherein the modulation circuit includes:
   a compensator to generate an error voltage from an output voltage of the converter and a reference voltage;
   a voltage controlled oscillator to provide an output frequency based on the error voltage; and
   a pulse width modulation generator to generate the variable switching frequency based on the error voltage from the compensator and the output frequency from the voltage controlled oscillator.

13. The converter of claim 12, wherein the disabling circuit controls the voltage controlled oscillator to disable the variable switching frequency.

14. The converter of claim 9, further comprising:
   a control circuit connected to the modulation circuit and arranged to dynamically limit an inductor current in the power converter while the variable switching frequency of the power converter changes.

15. The converter of claim 14, wherein a limit on the inductor current is based on an output voltage of the power converter or a load current of the power converter.

16. The converter of claim 14, wherein a limit on the inductor current is based on information from a power manager of a system in which the power converter resides.

17. A method, comprising:
   checking for a presence of a large current in an output capacitor of a switching mode power converter;
   adjusting a switching frequency of the switching mode power converter based on a difference between an output voltage of the power converter and a reference voltage during a transition from a discontinuous conduction mode to a continuous conduction mode if the large current in the output capacitor is not detected; and
   setting the switching frequency of the switching mode power converter to a relatively high frequency value if the large current in the output capacitor is detected.

18. The method of claim 17, wherein the checking includes comparing a derivative of a voltage of the output capacitor with a fixed threshold.

19. The method of claim 17, further comprising:
   dynamically limiting an inductor current in the power converter based on a variable parameter of the power converter.

20. The method of claim 19, wherein the dynamically limiting limits the inductor current in the power converter based on a load current of the power converter.

* * * * *